June 12, 1945.　　A. R. VAN C. WARRINGTON　　2,378,268
PROTECTIVE APPARATUS
Filed Nov. 24, 1943
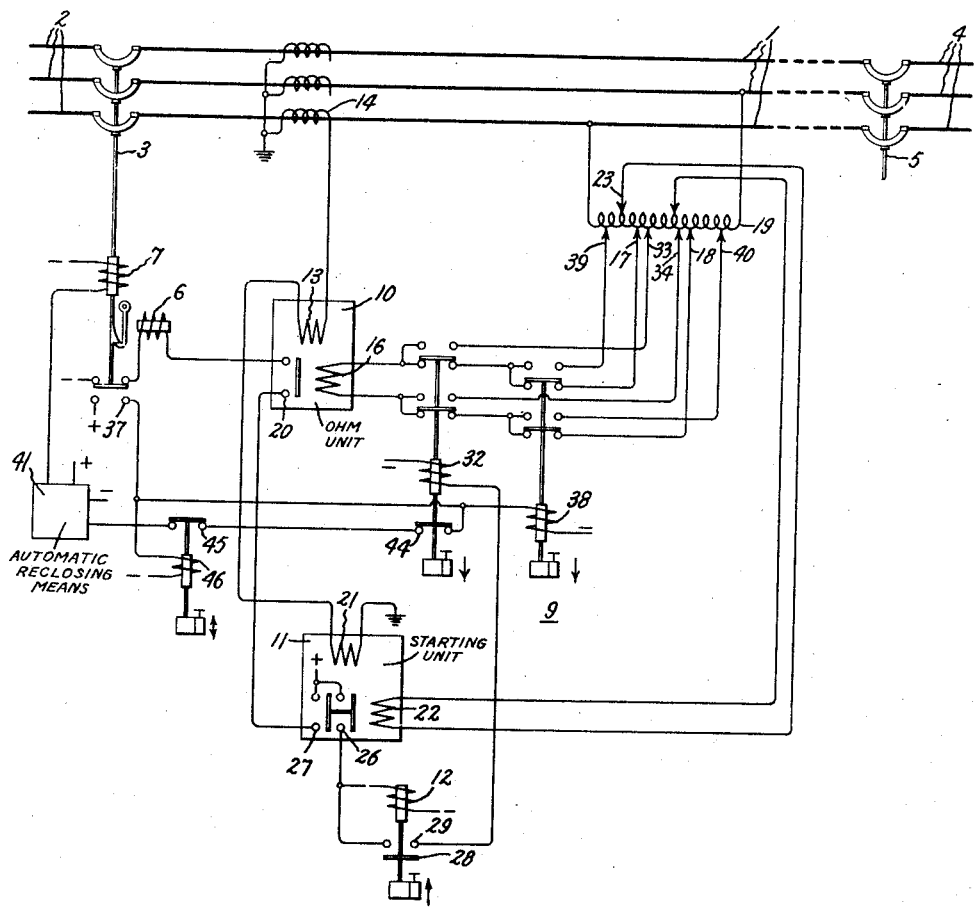
Inventor:
Albert R. van C. Warrington,
by Harry E. Dunham
His Attorney.

Patented June 12, 1945

2,378,268

UNITED STATES PATENT OFFICE 2,378,268

PROTECTIVE APPARATUS

Albert R. van C. Warrington, Wallingford, Pa., assignor to General Electric Company, a corporation of New York Application November 24, 1943, Serial No. 511,573

12 Claims. (Cl. 175—294)

My invention relates to protective apparatus and particularly to apparatus for protecting a section of a sectionalized electric system by means of protective relays of the distance type.

It is common practice in a sectionalized electric system to provide, at each end of a section to be protected, a circuit breaker and an associated distance relay, which is designed to effect an instantaneous opening of the circuit breaker if the fault is at a point within a predetermined portion of the section and to effect a time delayed opening of the associated circuit breaker if the fault is located in the adjacent section and within a predetermined distance from the associated circuit breaker. In order to prevent the undesirable tripping of the circuit breaker in a sound section when a fault occurs near the adjacent end of the next section, it is the usual practice to set each distance relay so that its instantaneous ohmic setting is such that the reach of the relay is less than the total length of the section. Consequently, if a fault occurs within the section but beyond the instantaneous ohmic setting of the distance relay, the fault is not cleared until after a sufficient time interval has elapsed to allow the associated distance relay to effect a time delayed opening of the circuit breaker.

One object of my invention is to provide an improved protective arrangement for a section of a sectionalized electric system whereby a fault anywhere within the section will effect first an instantaneous disconnection of the faulty section, then a quick reconnection of the faulty section and then a second instantaneous disconnection if the fault is within a predetermined portion of the section and whereby if the initial instantaneous disconnection of the section is effected by a fault in an adjacent section or by a fault in the section but outside said predetermined portion, it is automatically restored to service as quickly as possible and then is not again disconnected until after the fault has remained connected to the system for a predetermined time.

In accordance with my invention, I provide an arrangement for reclosing the circuit breaker as quickly as possible after the initial opening thereof and for decreasing temporarily after the initial opening the instantaneous ohmic setting of the associated distance relay from a value whereby the relay has a reach extending beyond the associated section to a value whereby the relay has a reach which terminates at a predetermined point within the associated section.

My invention will be better understood from the following description when taken in connection with the accompanying drawing, the single figure of which illustrates diagrammatically an embodiment of my invention in a protective arrangement for a circuit breaker at one end of a section of a sectionalized electric system, and the scope of my invention will be pointed out in the appended claims.

As shown in the accompanying drawing, the sectionalized electric system is a three-phase system comprising a section 1, one end of which is arranged to be connected to a bus section 2 by a suitable circuit interrupter 3 and the other end of which is arranged to be connected to another bus section 4 by a suitable circuit breaker 5. The circuit breaker 3 is shown as being of the latched closed type having a trip coil 6 and a closing coil 7, but it will be obvious that each of the circuit breakers may be of any suitable type, examples of which are well known in the art.

In order to control the opening of the circuit breaker 3 in accordance with the distance between the circuit breaker and the fault when a fault occurs on section 1 or on the next section (not shown) which is connected to the bus section 4, I provide a distance relay 9 of any suitable type, examples of which are well known in the art, whereby an instantaneous opening of the circuit breaker 3 is effected if the fault occurs within a predetermined distance range from the circuit breaker 3 and a time delayed opening of the circuit breaker 3 is effected if an instantaneous opening is not effected and the fault is within a greater predetermined distance range from the circuit breaker 3. As shown in the drawing, the distance relay 9 comprises an ohm unit 10, a starting unit 11, and a timing unit 12. In order to simplify the disclosure, these units are shown as single-phase units and as being associated with only one of the phase conductors of the polyphase section 1, but it will be obvious to those skilled in the art that in actual practice there may be similar single-phase units for each of the phases of the section.

The ohm unit 10 includes a current winding 13 connected to the secondary winding of a current transformer 14, the primary winding of which is connected in series with one of the phase conductors of the section 1, and a voltage winding 16 which is normally connected to the taps 17 and 18 of an autotransformer 19, the primary winding of which is connected between two of the phase conductors of the section 1. The ohm unit 10 may be of any suitable construction so that a fault within a predetermined distance from the point where the relay is connected, which is preferably a point as near the circuit breaker 3 as possible, causes the ohm unit 10 to close its contacts 20 instantly. In the embodiment of my invention shown in the drawing, it is assumed that this predetermined distance extends to a point beyond the circuit breaker 5 so that the relay 9 normally has a reach which terminates at a point beyond the circuit breaker 5.

The starting unit 11 includes a current winding 21, which is also connected to the secondary winding of the current transformer 14, and a voltage winding 22, which is connected to the taps 23 and 24 on the autotransformer 19. The starting unit 11 may be of any suitable construction whereby its contacts 26 and 27 are instantaneously closed in response to faults to the right of the point where the starting unit is connected to the section 1, which preferably is a point as near the circuit breaker 3 as possible.

The operation of the timing unit 12 is arranged to be initiated in response to the closing of the contacts 26 of the starting unit and is arranged, when energized for a predetermined time, to move its movable contact 28 into engagement with the stationary contact 29. The engagement of the contact 28 with the stationary contact 29 effects the energization of a transfer relay 32, which when energized transfers the connections of the voltage winding 16 of the ohm unit 10 to the taps 33 and 34 on the autotransformer 19 so as to increase the reach of the ohm unit 10 a predetermined amount.

In order to effect an instantaneous reclosure of the circuit breaker 3 after an instantaneous opening thereof has been effected by a fault within the normal reach of the ohm unit 10, the circuit breaker 3 is provided with the auxiliary contacts 37, which when closed are arranged to initiate the operation of suitable automatic reclosing means 41 so as to effect an instantaneous reclosure of the circuit breaker 3. The automatic reclosing means 41 is also arranged so as to prevent further automatic reclosures of the circuit breaker 3 if it fails to remain closed for a predetermined time after any reclosure. Since such automatic reclosing means are well known in the art and the details of such means form no part of my present invention, I have represented the automatic reclosing means 41 merely by a suitably labeled rectangle.

The closing of the contacts 37 on the circuit breaker 3 also is arranged to complete an energizing circuit for a time relay 38, which when energized transfers the connections of the voltage winding 16 of the ohm unit 10 from the taps 17 and 18 to the taps 39 and 40 on the autotransformer 19 so as to decrease the reach of the ohm unit 10 a predetermined amount, which in the embodiment shown in the drawing is assumed to be such an amount that the reach of the relay terminates at a predetermined point within the section 1. The transfer relay 38 is preferably of the instantaneous pickup, time delay drop-out type so as to insure that the voltage winding 16 remains connected to the taps 39 and 40 for a predetermined time after each reclosure of the circuit breaker 3.

Since it is desirable to effect an instantaneous reclosure only after the circuit breaker 3 has been opened by an instantaneous operation of the distance relay 9, the initiating circuit of the automatic reclosing means 41 includes the normally closed contacts 44 of the transfer relay 32 and also the normally closed contacts 45 of a time relay 46, which is arranged to be energized when the circuit breaker 3 is open.

While I have shown and described only the protective apparatus for the circuit breaker 3, it will be obvious that the circuit breaker 5 as well as each of the other circuit breakers of the sectionalized system may be provided with similar protective apparatus.

The operation of the embodiment of my invention shown in the drawing is as follows: When a fault occurs within the instantaneous tripping zone of the distance relay 9, the ohm unit 10 immediately closes its contacts 20 and the starting unit 11 immediately closes its contacts 26 and 27. The simultaneous closures of the contacts 20 and 27 complete an energizing circuit for the trip coil 6 so as to effect an instantaneous opening of the circuit breaker 3.

The closing of the auxiliary contacts 37 of the circuit breaker 3, when it opens, completes energizing circuits for the relays 38 and 46 and also completes the initiating circuit of the automatic reclosing means 41 through the contacts 44 of the transfer relay 32 and the contacts 45 of the time relay 46 before this relay has time to complete its timing operation. The automatic reclosing means 41 then effects an instantaneous reclosure of the circuit breaker 3 in a manner well known in the art. The energization of the transfer relay 38 transfers the connections of the voltage winding 16 of the ohm unit 10 from the taps 17 and 18 to the taps 39 and 40 of the autotransformer 19 so that the reach of the ohm unit is decreased to a point within the section 1. Therefore, if the fault which caused the initial opening of the circuit breaker 3 is within the original setting of the ohm unit 10 but beyond the reach of the new ohmic setting of the ohm unit 10, this unit does not operate to effect another instantaneous opening of the circuit breaker 3 after the initial reclosure thereof. This time delay allows the protective apparatus associated with the circuit breaker connecting the bus section 4 to the next section to effect the disconnection thereof from the system if the fault is of a permanent character and is within the new setting of the ohm unit associated with the protective apparatus for the next section.

If, however, the fault which effected the initial opening of the circuit breaker 3 is of a permanent character and is located within the new ohmic setting of the ohm relay 10, this relay again immediately closes its contacts 20, after the circuit breaker 3 is reclosed, and effects another opening of the circuit breaker 3. No automatic reclosure of the circuit breaker 3 occurs, however, after this second opening because the circuit breaker 3 failed to remain closed long enough after the first reclosure to allow the automatic reclosing means 41 to be restored to its normal operating condition.

If the permanent fault is located within the section 1 but beyond the decreased ohmic setting of the ohm unit 10 so that the contacts 20 are not reclosed after the circuit breaker 3 is reclosed, the circuit breaker 3 remains closed after the first reclosure thereof until the contact 28 of the time relay 12 is moved into engagement with the stationary contact 29. As soon as the circuit breaker 3 is reclosed, the starting unit 11 closes its contacts 26, if the fault is still connected to the system, and initiates the operation of the timing unit 12. When the contacts 28 and 29 are in engagement, the transfer relay 32 transfers the connections of the voltage winding 16 of the ohm unit 10 from the taps 17 and 18 to the taps 33 and 34 on the autotransformer 19 so that the reach of the ohm unit 10 is extended to a predetermined point on the next section beyond the bus section 4. If the fault is located within the new ohmic setting of the ohm relay 10, it immediately closes its contacts 20 and effects another opening of the circuit breaker 3. No automatic reclosure of the circuit breaker occurs after this time delayed opening, however, because the starting circuit of the automatic reclosing means 41 is open at the contacts 44 of the transfer relay 32, which is so designed that it maintains its contacts 44 open for a predetermined time after the transfer relay is deenergized. In order to insure that the automatic reclosing means does not effect after a time delay a reclosure in response to the relay 32 reclosing its contacts 44 after the circuit breaker 3 has been opened for a predetermined time, the time setting of the relay 46 is so adjusted that the time it takes this relay to open its contacts 45, when energized in response to the opening of the circuit breaker 3, is less than the time it takes the contacts 44 to reclose after the relay 32 is deenergized by the resetting of the distance relay after it has effected the opening of the circuit breaker.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In a protective arrangement for a section of a sectionalized electric system having a circuit interrupter at one end of said section, means for opening said circuit interrupter including an instantaneous distance relay energized from said system at a point near one end of said section and normally having a predetermined ohmic setting, means for automatically reclosing said circuit interrupter after it opens, and means responsive to an opening of said circuit interrupter for decreasing the ohmic setting of said relay for a predetermined time.

2. In a protective arrangement for a section of a sectionalized electric system having a circuit interrupter at one end of said section, means for opening said circuit interrupter including an instantaneous distance relay energized from said system at a point near one end of said section and normally having a predetermined ohmic setting, and means responsive to an opening of said circuit interrupter for decreasing the ohmic setting of said relay.

3. In a protective arrangement for a section of a sectionalized electric system having a circuit interrupter at one end of said section, means for opening said circuit interrupter including an instantaneous distance relay energized from said system at a point near one end of said section and normally having a reach extending beyond the other end of said section, and means responsive to an opening of said circuit interrupter for decreasing the extent of the reach of said relay to a point within said section.

4. In a protective arrangement for a section of a sectionalized electric system having a circuit interrupter at one end of said section, means for opening said circuit interrupter including an instantaneous distance relay energized from said system at a point near one end of said section and normally having a reach extending beyond the other end of said section, means for automatically reclosing said circuit interrupter when it opens, and means responsive to an opening of said circuit interrupter for decreasing the extent of the reach of said relay to a predetermined point within said section.

5. In a protective arrangement for a section of a sectionalized electric system having a circuit interrupter at one end of said section, means for opening said circuit interrupter including an instantaneous distance relay energized from said system at a point near one end of said section and normally having a reach extending beyond the other end of said section, means for automatically reclosing said circuit interrupter when it opens, means responsive to an opening of said circuit interrupter for changing the connections of said relay so as to decrease the extent of said reach to a predetermined point within said section, and means responsive to an opening of said circuit breaker for rendering said automatic reclosing means inoperative after a predetermined time interval.

6. In a protective arrangement for a section of a sectionalized electric system having a circuit interrupter at one end of said section, means for opening said circuit interrupter including an instantaneous distance relay energized from said system at a point near one end of said section and normally having a reach extending beyond the other end of said section, means for automatically reclosing said circuit interrupter when it opens and for preventing further reclosures if said circuit interrupter fails to remain closed for a predetermined time after any reclosure, and means responsive to an opening of said circuit interrupter for decreasing the extent of the reach of said relay to a predetermined point within said section.

7. In a protective arrangement for a section of a sectionalized electric system having a circuit interrupter at one end of said section, means for opening said circuit interrupter including an instantaneous distance relay having a voltage winding connected to said system at a point near one end of said section and normally having a predetermined ohmic setting, means for automatically reclosing said circuit interrupter after it opens, and means responsive to the opening of said circuit interrupter for increasing the voltage applied to said voltage winding while said circuit interrupter is open and for a predetermined time after the circuit breaker is closed.

8. In a protective arrangement for a section of a sectionalized electric system having a circuit interrupter at one end of said section, means for opening said circuit interrupter including a distance relay energized from said system at a point near one end of said section and normally having an instantaneous ohmic setting and a time delayed ohmic setting, means responsive to the opening of said circuit interrupter for changing the instantaneous ohmic setting of said relay, and means responsive to the opening of said circuit interrupter for effecting an instantaneous reclosure of said circuit interrupter.

9. In a protective arrangement for a section of a sectionalized electric system having a circuit interrupter at one end of said section, means for opening said circuit interrupter including a distance relay energized from said system at a point near one end of said section and normally having an instantaneous ohmic setting and a time delayed ohmic setting, means responsive to the opening of said circuit interrupter for decreasing the instantaneous ohmic setting of said relay and for maintaining said decreased ohmic setting until after the circuit interrupter has remained closed for a predetermined time interval, and means responsive to the opening of said circuit interrupter for effecting the automatic reclosing thereof.

10. In a protective arrangement for a section of a sectionalized electric system having a circuit interrupter at one end of said section, means for opening said circuit interrupter including a distance relay energized from said system at a point near one end of said section and normally having an instantaneous ohmic setting and a time delayed ohmic setting, means responsive to the opening of said circuit interrupter for decreasing the instantaneous ohmic setting of said relay and for maintaining said decreased ohmic setting until after the circuit interrupter has remained closed for a predetermined time interval, means responsive to the opening of said circuit interrupter for effecting the automatic reclosing thereof, and means controlled by said relay for preventing a reclosure of said circuit interrupter after said interrupter has opened in response to a time delayed operation of said distance relay.

11. In a protective arrangement for a section of a sectionalized electric system having a circuit interrupter at one end of said section, means for opening said circuit interrupter including a distance relay energized from said system at a point near one end of said section and normally arranged to respond instantaneously to a fault within a predetermined distance that extends beyond the other end of said section and to respond after a predetermined time interval to a fault within a greater predetermined distance that extends beyond said other end of said section, means responsive to the opening of said circuit interrupter for changing the connections of said relay so that its instantaneous response is decreased to a shorter predetermined distance that terminates within said section and for maintaining said decreased distance setting until after said circuit interrupter has remained closed for a predetermined time interval, and means responsive to the opening of said circuit interrupter for effecting an instantaneous reclosure thereof.

12. In a protective arrangement for a section of a sectionalized electric system having a circuit interrupter at one end of said section, means for opening said circuit interrupter including a distance relay energized from said system at a point near one end of said section and normally arranged to respond instantaneously to a fault within a predetermined distance that extends beyond the other end of said section and to respond after a predetermined time interval to a fault within a greater predetermined distance that extends beyond said other end of said section, means responsive to the opening of said circuit interrupter for changing the connections of said relay so that its instantaneous response is decreased to a shorter predetermined distance that terminates within said section and for maintaining said decreased distance setting until after said circuit interrupter has remained closed for a predetermined time interval, means responsive to the opening of said circuit interrupter for effecting an instantaneous reclosure thereof and for preventing further automatic reclosures when the circuit interrupter fails to remain closed for a predetermined time after any reclosure, and means for rendering said automatic reclosing means inoperative to reclose said circuit interrupter after an opening thereof has been effected in response to a time delayed operation of said distance relay.

ALBERT R. van C. WARRINGTON.